(12) United States Patent
Mankovskii et al.

(10) Patent No.: US 9,324,000 B2
(45) Date of Patent: Apr. 26, 2016

(54) IDENTIFYING OBJECTS IN AN IMAGE USING CODED REFERENCE IDENTIFIERS

(71) Applicant: CA, INC., Islandia, NY (US)

(72) Inventors: Serguei Mankovskii, Santa Clara, CA (US); Maria C. Velez-Rojas, San Jose, CA (US); Howard Abrams, San Mateo, CA (US)

(73) Assignee: CA, Inc., New York, NY (US)

( * ) Notice: Subject to any disclaimer, the term of this patent is extended or adjusted under 35 U.S.C. 154(b) by 5 days.

(21) Appl. No.: 14/341,460

(22) Filed: Jul. 25, 2014

(65) Prior Publication Data

US 2016/0026888 A1  Jan. 28, 2016

(51) Int. Cl.
 *G06K 9/00* (2006.01)
 *G06K 9/32* (2006.01)
 *G06T 7/60* (2006.01)

(52) U.S. Cl.
 CPC .............. *G06K 9/3241* (2013.01); *G06T 7/602* (2013.01)

(58) Field of Classification Search
 CPC combination set(s) only.
 See application file for complete search history.

(56) References Cited

U.S. PATENT DOCUMENTS

| | | | | |
|---|---|---|---|---|
| 6,201,901 B1* | 3/2001 | Zhou | ........................ | G06K 7/14 235/462.09 |
| 6,565,003 B1* | 5/2003 | Ma | ..................... | G06K 7/10861 235/462.08 |
| 6,782,116 B1* | 8/2004 | Zhao | ..................... | G06T 1/0028 382/100 |
| 2003/0127518 A1* | 7/2003 | Park | ........................ | G06K 7/14 235/462.25 |
| 2004/0099741 A1* | 5/2004 | Dorai | ....................... | G06K 7/14 235/462.08 |
| 2006/0060655 A1* | 3/2006 | Tsunobuchi | ............. | G06K 7/10 235/462.48 |
| 2009/0212113 A1* | 8/2009 | Chiu | ........................ | G06K 7/14 235/462.41 |
| 2010/0008584 A1* | 1/2010 | Brown | ................. | G06Q 10/087 382/190 |

\* cited by examiner

*Primary Examiner* — Alex Liew
(74) *Attorney, Agent, or Firm* — Myers Bigel & Sibley, P.A.

(57) ABSTRACT

Image processing is performed to identify an image of a physical object within a digital image. A boundary of the image of the physical object may be determined. A coded reference identifier that is contained within the boundary of the image of the physical object may be recognized. A database record for the coded reference identifier may be associated with a database record for the physical object.

17 Claims, 12 Drawing Sheets

US 9,324,000 B2

IDENTIFYING OBJECTS IN AN IMAGE USING CODED REFERENCE IDENTIFIERS

BACKGROUND

The present disclosure relates to computer systems, methods, and program products and in particular to image processing systems, methods, and program products.

An image may provide a comprehensive view of a physical space. The image may be created by photographing or obtaining a digital representation of the physical space including the objects in the physical space, For example, a data center may be a large physical space used to house computer systems and associated components such as communications and storage systems. Data centers are proliferating across the world with the increase in use of technology, such as the Internet, virtualization and cloud computing. A data center can provide advantages, such as hosting large numbers of computers, commonly referred to as "servers", in a small space, which can also provide simplified cabling, a controlled environment (such as air conditioning and fire suppression), redundant or backup power supplies and security. The servers are generally arranged in racks, which themselves may be arranged in aisles of the data center. An image of a data center may depict a variety of objects in the data center such as data center equipment including servers, network storage devices, computing devices, network routers, network gateways, wireless/wired network interface devices, etc.

SUMMARY

According to various embodiments the digital image may include an image of the data center and the physical object may include data center equipment in the data center. The image of the data center may include a plurality of images of a plurality of data center equipments in the data center including the physical object.

According to various embodiments image processing may be performed on the digital image to identify an image of a physical object within a digital image. A boundary of the image of the physical object in the digital image may be determined. A coded reference identifier that is contained within the boundary of the image of the physical object may be recognized. A database record for the coded reference identifier may be associated with the database record for the physical object.

According to some embodiments, the digital image may be an image of a data center. The physical object may be data center equipment in the data center. Performing image processing to identify the image of the physical object within the digital image may include receiving a selection of a portion of the image of the data center. Image processing may be performed on the image to identify the image of the data center equipment indicated by the selection.

According to some embodiments, recognizing the coded reference identifier that is contained within the boundary of the physical object in the digital image may include searching within the boundary of the data center equipment in the digital image to identify a coded reference identifier. It may be determined if the coded reference identifier is affixed to a null object such as a glass wall based on information referenced by the coded reference identifier. Based on determining that the coded reference identifier is affixed to a null object, the database record for the coded reference identifier may be disassociated from the database record for the data center equipment.

In some embodiments, searching within the boundary of the data center equipment in the digital image may occur to identify auxiliary information. Auxiliary information and information referenced by the coded reference identifier may be corroborated to verify the data center equipment. The auxiliary information may include alphanumeric characters such as a company logo. The auxiliary information may include another coded reference identifier.

According to some embodiments, associating the database record for the coded reference identifier with the database record for the physical object may include creating a database record with an association between the database record for the physical object and the database record for the coded reference identifier. In some embodiments, the coded reference identifier may identify information related to a database record of the data center equipment in the data center.

According to some embodiments performing image processing to identify the image of the physical object within the digital image may be preceded by creating a coded reference identifier label based on the database of data center equipment inventory. The coded reference identifier label may be attached to the dater center equipment. The digital image may be created such that the digital image includes the data center equipment having the coded reference identifier label attached thereto. The performing, determining, recognizing, and associating may be performed repeatedly at a plurality of different times.

According to some embodiments, image processing may be performed on the image of the data center to identify the plurality of images associated with the plurality of data center equipments. Respective boundaries of the plurality of images associated with the plurality of data center equipments may be determined. A plurality of coded reference identifiers that are contained within boundaries of respective ones of the plurality of images may be recognized, Respective ones of a plurality of coded reference identifiers may be associated with respective ones of the plurality of the data center equipments.

The image may include a first image of the data center that is captured at a first time. The plurality of images may include a first plurality of images and the plurality data center equipments may include a first plurality of data center equipments. The plurality of coded reference identifiers may include a first plurality coded reference identifiers associated with the first plurality of data center equipments. Image processing may be performed on the second image at a second time, different from the first time, to identify a second plurality of images of a second plurality data center equipments. The boundaries of respective ones of the second plurality of images of the second plurality of data center equipment may be determined. A second plurality of coded reference identifiers that are contained within the respective boundaries of the second plurality of images may be recognized. The second plurality of coded reference identifiers may be associated with a second plurality of data center equipments. Information referenced by the first plurality of coded reference identifiers associated with the first plurality of data center equipments and information reference by the second plurality of coded reference identifiers associated with the second plurality of data center equipments may be compared to identify differences between the information referenced by the first plurality of coded reference identifiers and the information referenced by the second plurality of coded reference identifiers. Movement of one of the first plurality of data center equipments may be identified responsive to the comparing.

It will also be understood that various embodiments have been described above in connection with methods of operating a computer system. However, various other embodiments described herein can provide analogous apparatus and computer programs.

For example, according to various embodiments an apparatus may include a processor and a memory coupled to the processor which includes computer readable program code that when executed by the processor causes the processor to perform operations including performing image processing on a digital image to identify an image of a physical object within a digital image. A boundary of the image of the physical object in the digital image may be determined. A coded reference identifier that is contained within the boundary of the image of the physical object may be recognized. A database record for the coded reference identifier may be associated with the database record for the physical object.

Moreover, some embodiments a computer program product may include a computer readable storage medium including computer readable program code embodied in the medium therewith, the computer readable program code comprising computer readable program code configured to perform image processing to identify an image of a physical object within a digital image, computer readable program code configured to determine a boundary of the image of the physical object in the digital image, computer readable program code configured to recognize a coded reference identifier that is contained within the boundary of the image of the physical object, and computer readable program code configured to associate a database record for the coded reference identifier with a database record for the physical object.

It is noted that aspects described with respect to one embodiment may be incorporated in different embodiments although not specifically described relative thereto. That is, all embodiments and/or features of any embodiments can be combined in any way and/or combination. Moreover, other resource management nodes, distributed computing systems, methods, apparatus, and/or computer program products according to embodiments will be or become apparent to one with skill in the art upon review of the following drawings and detailed description. It is intended that all such additional resource management nodes, distributed computing systems, methods, and/or computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Figure 1:
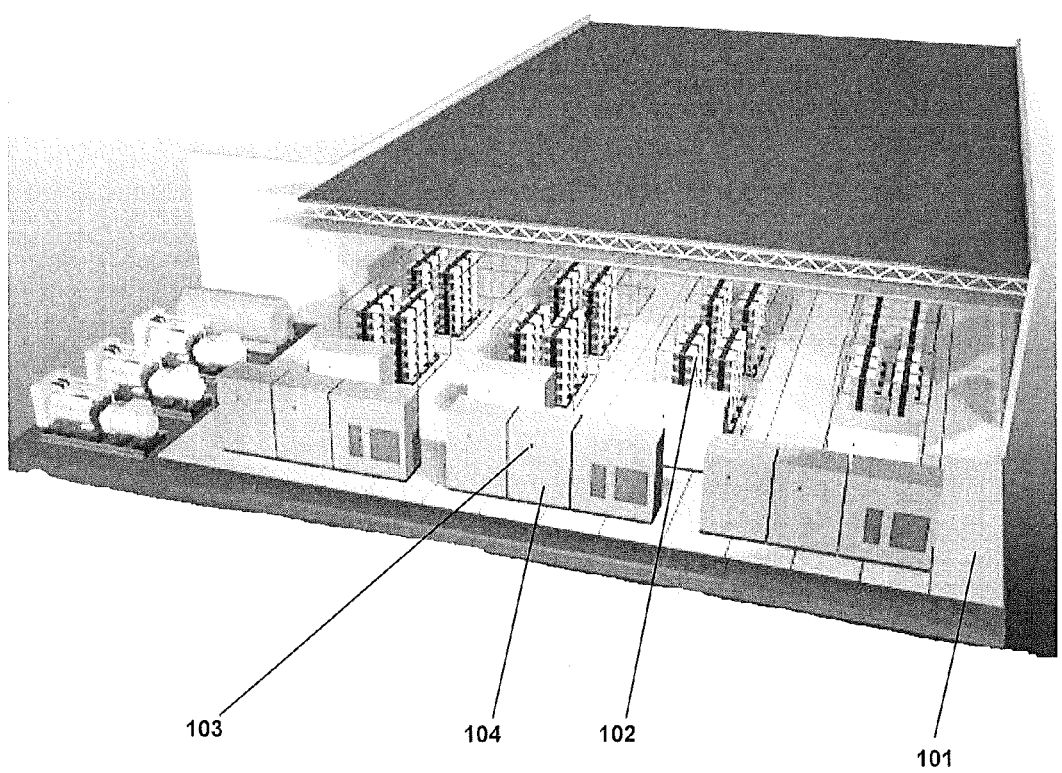
FIG. 1 is an illustration of a data center according to some embodiments.

Various embodiments will be described more frilly hereinafter with reference to the accompanying drawings. Other embodiments may take many different forms and should not be construed as limited to the embodiments set forth herein. Like numbers refer to like elements throughout. Numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As noted above, data centers are proliferating around the world with increased demand for higher speed data communication. Data centers may include a multitude of data center equipment such as servers. A data center may include, for example, thousands of servers housed in a single physical facility. The servers may generally be arranged in racks, which themselves may be arranged in aisles of the data center. These servers may be physically moved, removed from service upon fault detection, and/or temporarily taken out of service for maintenance. Data center operators may desire to know information such as location and attributes about each of the servers in the data center in order to improve performance of the overall data center. Updating of such information may be done manually by data center personnel who regularly may physically inventory the data center equipment and enter the information in a database. This manual updating may lead to errors and an inaccurate representation of the servers in the data center.

Physical spaces such as data centers include various physical objects such as data center equipment, each with specific attributes. Various embodiments described herein may arise from a recognition that an accurate listing of specific data center equipment including location and attributes may be necessary for proper and/or effective operation of the data center. In order to allow a more accurate listing, the data center may be represented in a digital image. The digital image may be used as a virtual reality image in a virtual environment. Image processing may be utilized to distinguish various physical objects in the digital image. The physical objects may be identified to be a type of object such as, for example, a server or a router. Image processing of the digital image may not provide information about the specific instance of the object in a digital image. However, various embodiments described herein can provide techniques for recognizing and associating a coded reference identifier on the physical object in the digital image. Thus, an accurate listing of the movement and/or attributes of the data center equipment may be provided.

For ease of discussion, a non-limiting, ongoing example of a data center including data center equipment will be discussed. However, the techniques discussed here may be applied to other physical spaces such as, for example, a rental car parking lot including automobiles, or any other physical environment where a large number of physical objects are present.

FIG. 1 is an illustration of a data center according to some embodiments described herein. The data center 101 may be a facility to house computer systems and/or associated physical objects. The data center may include data center equipment such as communications equipment 102 including data networking equipment, telecommunications equipment, storage systems, servers, routers, gateways, and/or equipment racks arranged in aisles, rows, and/or stacked in columns. Data center equipment may include supporting equipment 104 such as power supplies, connectors, wiring, environmental controls such as HVAC, fire suppression equipment, and/or various security devices. Each data center equipment 102 and/or 104 may include a coded reference identifier 103.

Figure 2A:
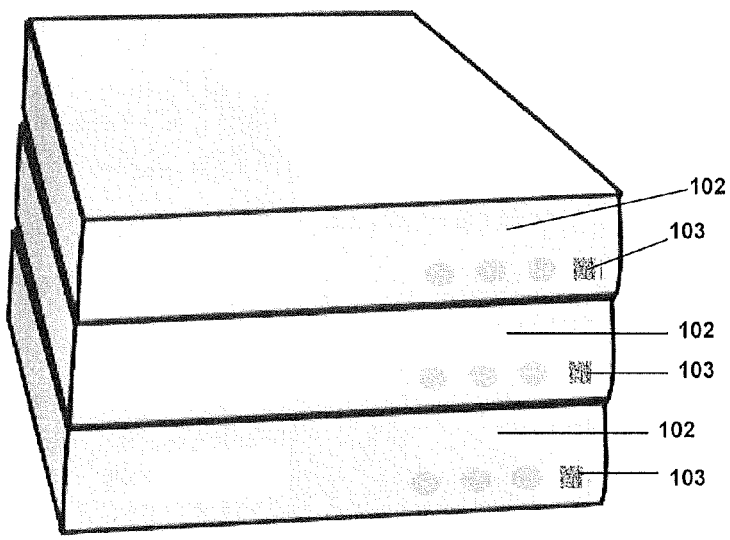
FIG. 2A is a perspective view of a plurality of data center equipments according to some embodiments.

FIG. 2A illustrates a plurality of data center equipments according to some embodiments. A plurality of data center equipments 102 and/or 104 may be located in the data center 101, specifically in a given rack number of a given aisle number of the data center 101. Each of the plurality of data center equipments 102 and/or 104 may include one or more coded reference identifiers 103 that is affixed to each of the plurality of data center equipments 102 and/or 104.

Figure 2B:
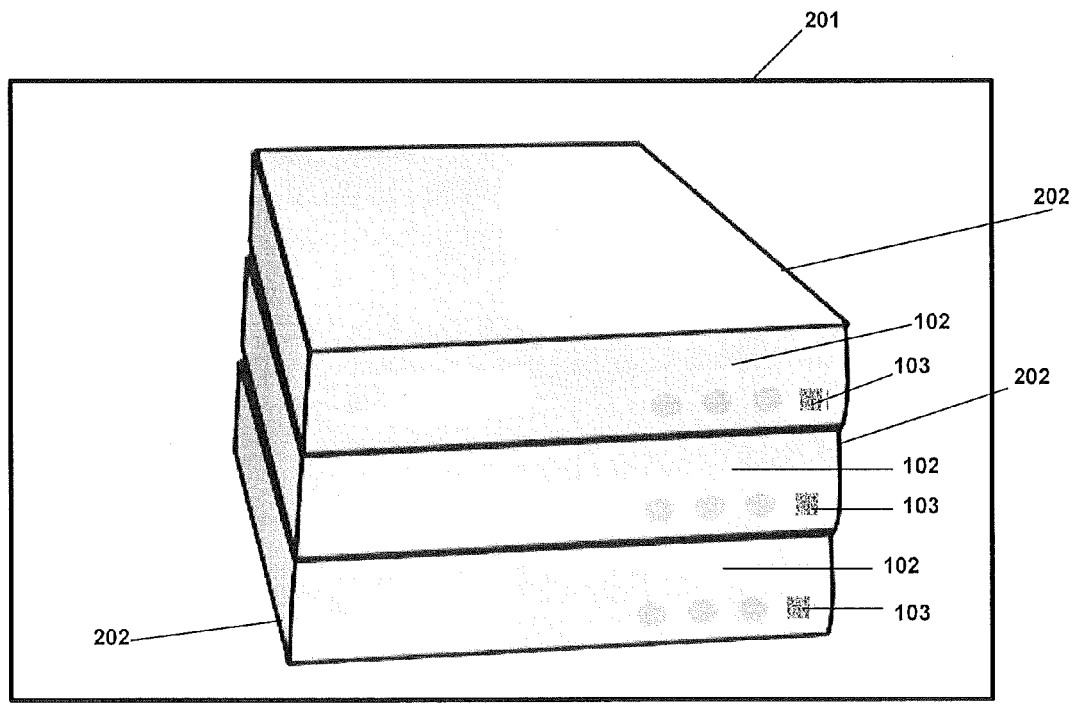
FIG. 2B is a digital image of the plurality of data center equipments of FIG. 2A, according to some embodiments.

FIG. 2B is a digital image 201 of the plurality of data center equipments 102 and/or 104 as in FIG. 2A, according to some embodiments. The digital image 201 may include images of the plurality of data center equipments 102 and/or 104. Each of the plurality of data center equipments 102 and/or 104 may have a boundary 202 of the image. The digital image 201 includes an image of each of the coded reference identifiers 103 that are affixed to the plurality of data center equipments 102 and/or 104.

Figure 3A:
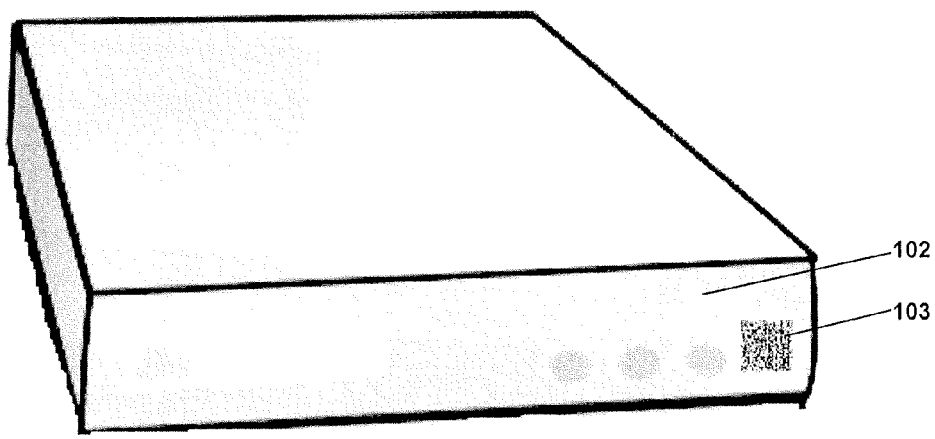
FIG. 3A is a perspective view of a data center equipment according to some embodiments.

FIG. 3A illustrates a data center equipment according to some embodiments. A data center equipment 102 and/or 104 may be located in the data center 101. The data center equipment 102 and/or 104 may include one or more coded reference identifiers 103 that is affixed to the data center equipment 102 and/or 104.

Figure 3B:
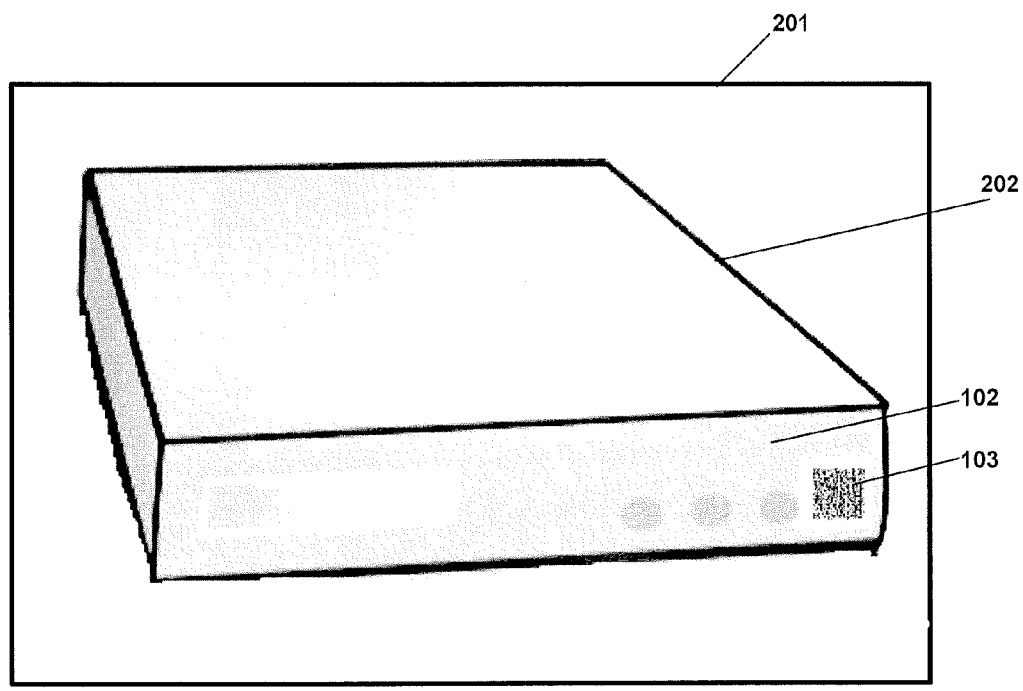
FIG. 3B is a digital image of the data center equipment of FIG. 3A, according to some embodiments.

FIG. 3B is a digital image 201 of a data center equipment 102 and/or 104, as in FIG. 3A, according to some embodiments. The digital image 201 may include an image of the data center equipment 102 and/or 104. The digital image 201 of the data center equipment may have a boundary 202 of the image. The digital image 201 includes an image of a coded reference identifier 103 that is affixed to the data center equipment 102 and/or 104. The coded reference identifier 103 may be contained within the boundary 202 of the data center equipment 102 and/or 104.

Figure 4:
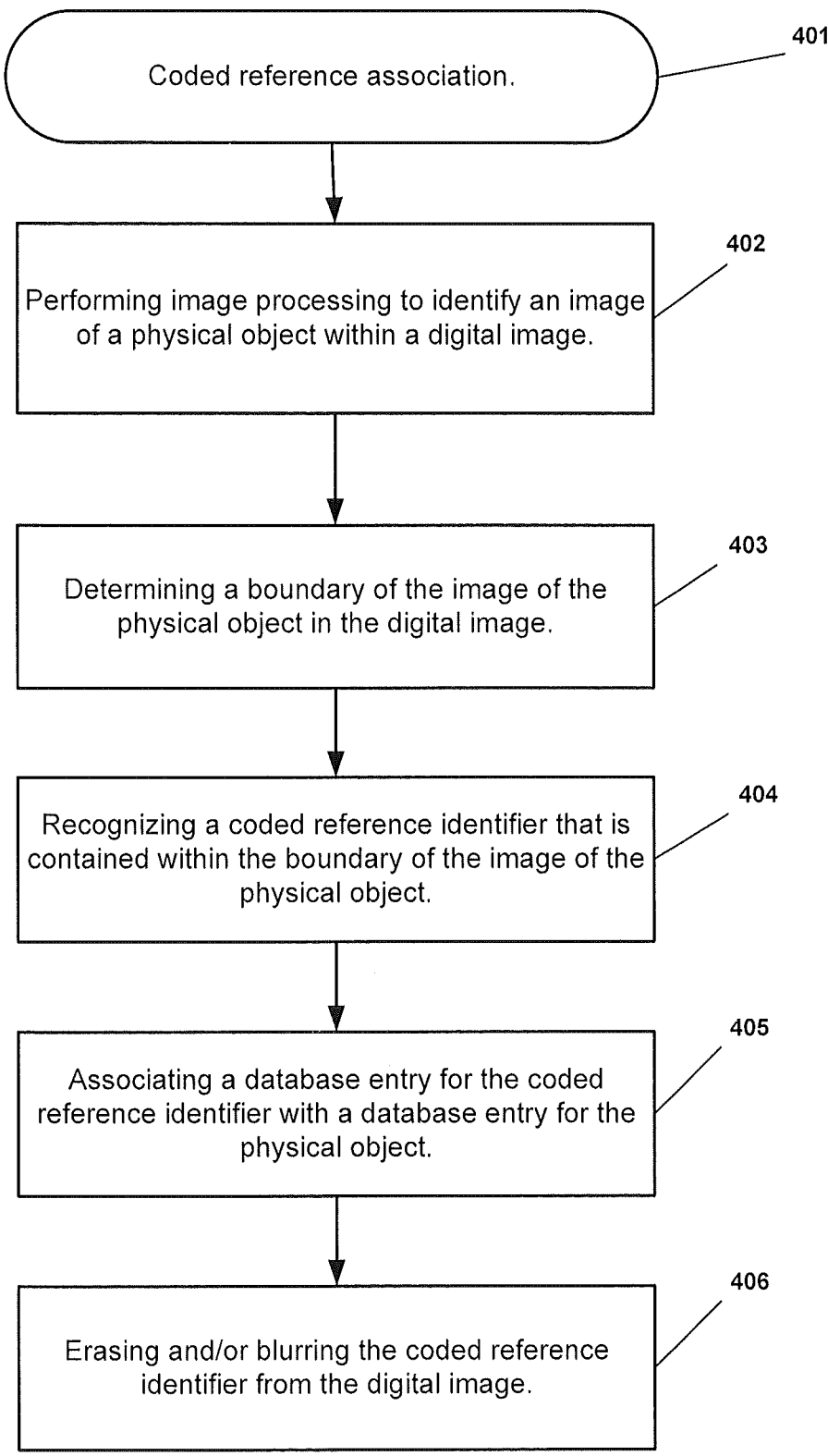
FIGS. 4-8 are flowcharts that illustrate operations for processing a digital image according to some embodiments.

FIG. 4 is a flowchart of operations to provide a coded reference association 401 according to various embodiments described herein. Referring to FIG. 4, at Block 402, image processing may be performed to identify an image of a physical object within a digital image. For example, FIGS. 2A and 2B and FIGS. 3A and 3B illustrate a physical object such as data center equipment 102 whose digital image 201 may be identified by image processing. Image processing may include conventional image processing techniques including any form of signal processing for which the input is an image, such as a photograph or video frame. The output of image processing may be either an image and/or a set of characteristics or parameters related to the image. Image processing may refer to digital image processing, optical image processing, and/or analog image processing.

At Block 403, a boundary 202 of FIG. 3B of the image of the physical object in the digital image may be determined. A boundary of the physical object may assume any shape of the physical object and may demark an area in the digital image that represents the physical object. A boundary may be determined for a two-dimensional and/or perspective view of the image.

Still referring to FIG. 4, at Block 404, a coded reference identifier 103 contained within the boundary 202 of FIG. 3B of the image of the physical object may be recognized. The coded reference identifier may be a Quick Response Code (QR code), barcode, UPC symbol, and/or any other machine recognizable coding system which may contain references to the physical object. The coded reference identifier may be recognized, according to some embodiments, by applying further image processing and/or image search algorithms.

At Block 405, a database record for the coded reference identifier may be associated with a database record for the physical object. A database may be an organized collection of data and/or information stored in any memory such that the database supports access to the stored data and/or information. The data and/or information may be stored as a database entry and/or database record. Existing database records may be associated and/or new database records may be created as needed and then associated. Association of the database record for the coded reference identifier with the database record for the physical object may be accomplished by a variety of methods such as creation of new records, use of data structures such as arrays, tables, and/or pointers, and/or other well-known database manipulation techniques. The database record may include information about the physical object may include information identifying the manufacturer, model number, serial number, capacity, etc. This information may associated with the coded reference identifier and the data center equipment based on the image.

Still referring to FIG. 4, at Block 406, the coded reference identifier may be erased from the digital image and/or blurred within the digital image 201 of FIG. 3B. The boundaries 202 of the image of the physical object may be used as a reference guide within which the image of the physical object may be erased or replaced with a different digital representation. Similarly, the boundaries 202 of the image of the physical object may be used as a reference guide within which the image of the physical object may be blurred or otherwise rendered to appear differently from the original digital image. The erasing and/or blurring of a portion of the digital image that includes the physical object may allow easier identification of the specific physical object within the digital image. The erasing and/or blurring may indicate that the physical object has been moved from a different location, is offline or otherwise non-functional, is new to the data center, and/or is functioning properly.

Figure 5:
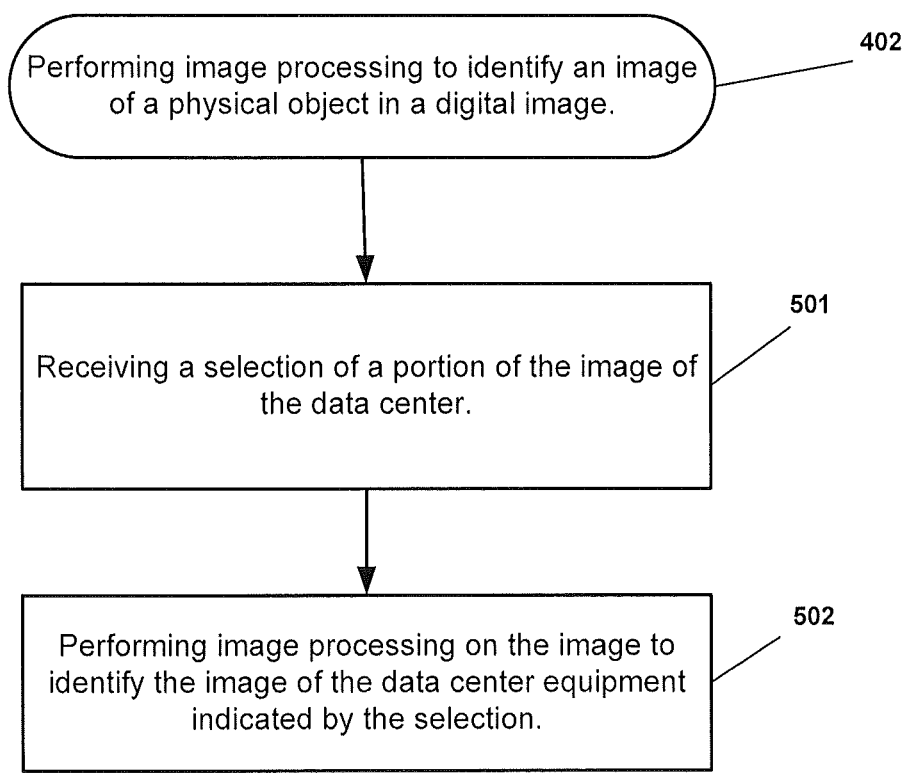

FIG. 5 is a flowchart of operations for Block 402 for performing image processing to identify an image of the physical object in the digital image 201 of FIG. 3B, according to some embodiments. Referring to FIG. 5, at Block 501, a selection of a portion of the image of the data center may be received. The selection may include a user selection, a predefined or preconfigured selection, and/or a randomly defined area of the image. Image processing may be performed on the selected portion of the image to reduce computation or to identify an object selected by a user such as a data center operator or to identify objects that are expected to be in the digital image.

Again referring to FIG. 5, at Block 502, image processing may be performed on the image to identify an image of the data center equipment indicated by the selection. This identification of the data center equipment image may be accomplished by conventional image processing techniques to identify sub-images and/or objects in the image. Boundaries 202 of the object in the image may be delineated to aide in distinguishing the physical object in the image from the surroundings.

Figure 6:
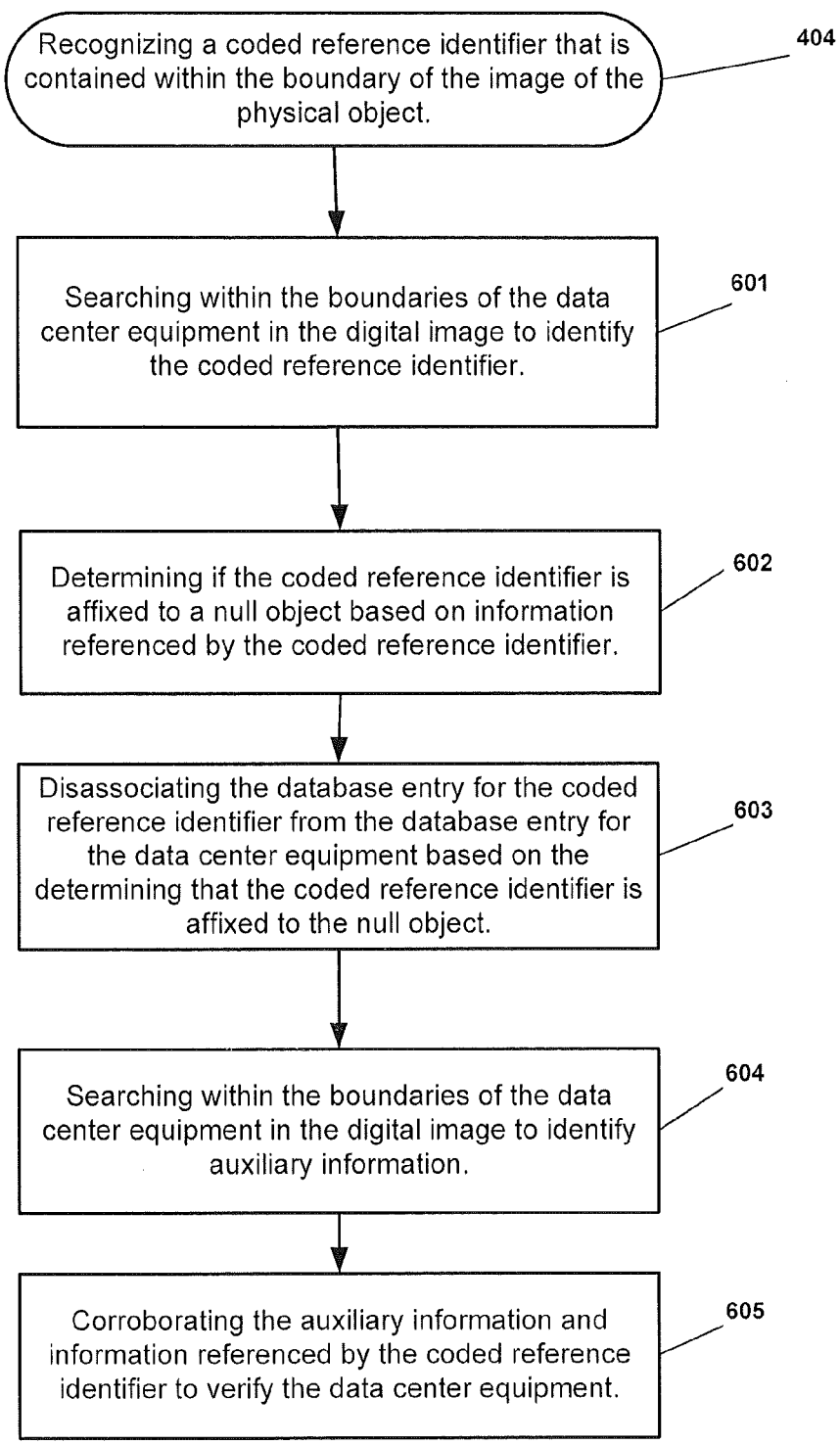

FIG. 6 is a flowchart of operations, as in Block 404, for recognizing a coded reference identifier 103 that is contained within the boundaries 202 of the image of the physical object 102. Referring to FIG. 6, at Block 601, the coded reference identifier is identified by searching within the boundaries 202 of the data center equipment in the digital image. At Block 602, it is determined if the coded reference identifier is affixed to a null object based on the information referenced by the coded reference identifier. The null object may be an element in the data center that is not central to the networking operations of the data center. For example, null objects may include transparent dividers between the aisles, doors on the equipment racks, environmental control units such as HVAC, and/or air handling units. These null objects present in the data center may have a coded reference identifier affixed to them. Information related to the coded reference identifier affixed to the null object may indicate that the object should be treated as a null object. However, if the coded reference identifier is affixed to a transparent surface, it may be possible for the coded reference identifier to be projected onto objects behind the null object. According to some embodiments, the coded reference identifier may indicate that the null object restricts airflow or creates climate zones within the data center.

Referring again to FIG. 6, at Block 603, if it is determined that the coded reference identifier is affixed to a null object, the database record for the coded reference identifier may be disassociated from the database record for the data equipment center. If an association of the database records has occurred, upon determination that the coded reference identifier 103 is affixed to a null object, disassociation may be accomplished by removing or modifying the database association by modifying records, arrays, tables, pointers, and/or other database elements. In some cases, the database records may not be associated with one another until after a check is performed to confirm that the object is not a null object. For example, it may be desired to ignore supporting equipment 104 of FIG. 1 such as HVAC equipment or glass walls. Capturing a digital image of an object through a glass wall may superimpose the coded reference identifier 103 of the glass wall on equipment located behind the glass wall. In such cases, it may be desirable to identify the coded reference identifier as belonging to a null object such as the glass wall and is not related to data center equipment 102 on which it was superimposed.

Still referring to FIG. 6, at Block 604, a search may be conducted within the boundaries 202 of the data center equipment in the digital image to identify auxiliary information. The auxiliary information may include alphanumeric characters, a brand label, a corporate logo, an inventory number, a model number, and/or another coded reference identifier.

Again referring to FIG. 6, at Block 605, the auxiliary information and information referenced by the coded reference identifier may be corroborated to verify the data center equipment. For example, a logo and/or a model number of a data center equipment may be verified against a database including the physical objects to confirm the type of data center equipment referenced by the coded reference identifier. For example, a data center equipment may include an IBM® corporate logo but the database may indicate a different equipment manufacturer. In this case, the verification may fail and an indication may be provided to the operator.

Figure 7:
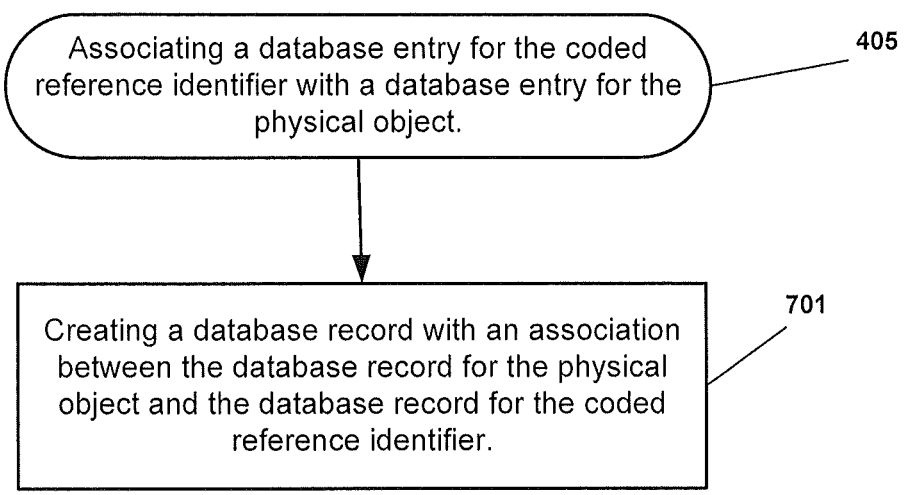

FIG. 7 is a flowchart of operations, as in Block 405, for associating a database record for the coded reference identifier with the database record for the physical object, according to various embodiments. Referring to FIG. 7, at Block 701, a database record may be created that includes an association between the database record for the physical object in the database record for the coded reference identifier. In some embodiments, a database record may be modified or updated based on the association.

Figure 8:
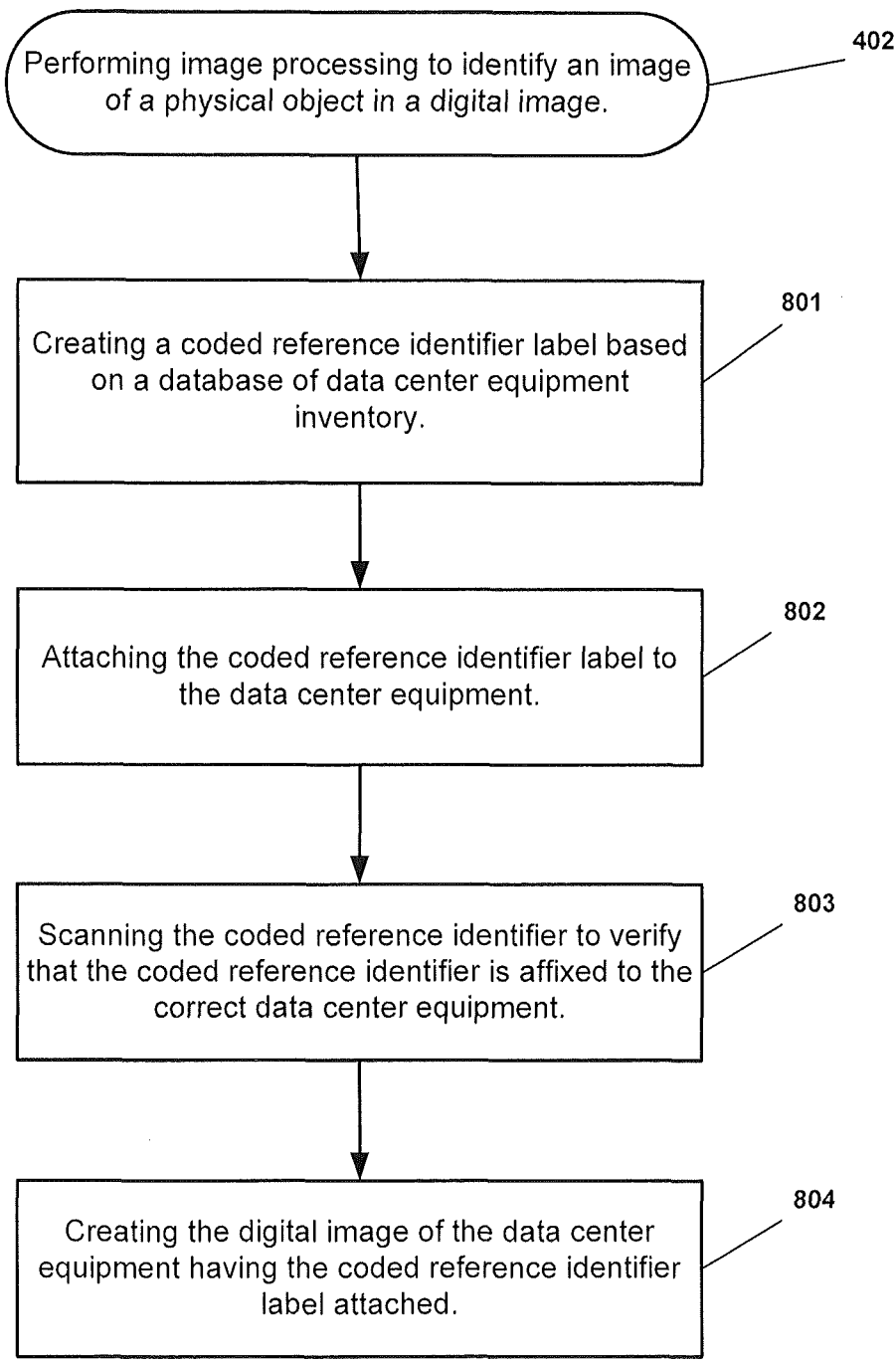

FIG. 8 is a flowchart of operations, as in Block 402 for performing image processing to identify an image of a physical object in a digital image, according to various embodiments. Referring to FIG. 8, at Block 801, a coded reference identifier label may be created based on a database of data center equipment inventory. A coded reference identifier label may include the coded reference identifier, a reference to an existing database record about the data center equipment, human readable information about the data center equipment, and/or other information related to the data center equipment. At Block 802, a coded reference identifier label may be attached to the data center equipment. The coded reference identifier label may be affixed on a prominent part of the data center equipment visible to a camera creating digital images for creation of a data center model. The entire coded reference identifier may be visible to the camera. A data center employee may manually scan the coded reference identifier to determine the specific equipment that may need to be moved or serviced.

Still referring FIG. 8, at Block 803, the coded reference identifier may be scanned by a scanner such as a QR code scanner, to verify that the coded reference identifier label is affixed to the correct data center equipment. In some embodiments, the coded reference identifier may be available for reading using a handheld scanner by a data center employee. The data center employee may manually scan the coded reference identifier once it has been affixed to the data center equipment. The scanner may then provide related information as indicated by the coded reference identifier. The data center employee may then verify that the coded reference identifier label has been affixed to the correct data center equipment. This operation may be performed at other times as well, for example, after Block 804, or before Block 802, At Block 804, the digital image of the data center equipment having the coded reference identifier label attached may be created. The digital image may be created by use of a camera, use of historical images and/or by integration into a virtual reality environment.

Figure 9:
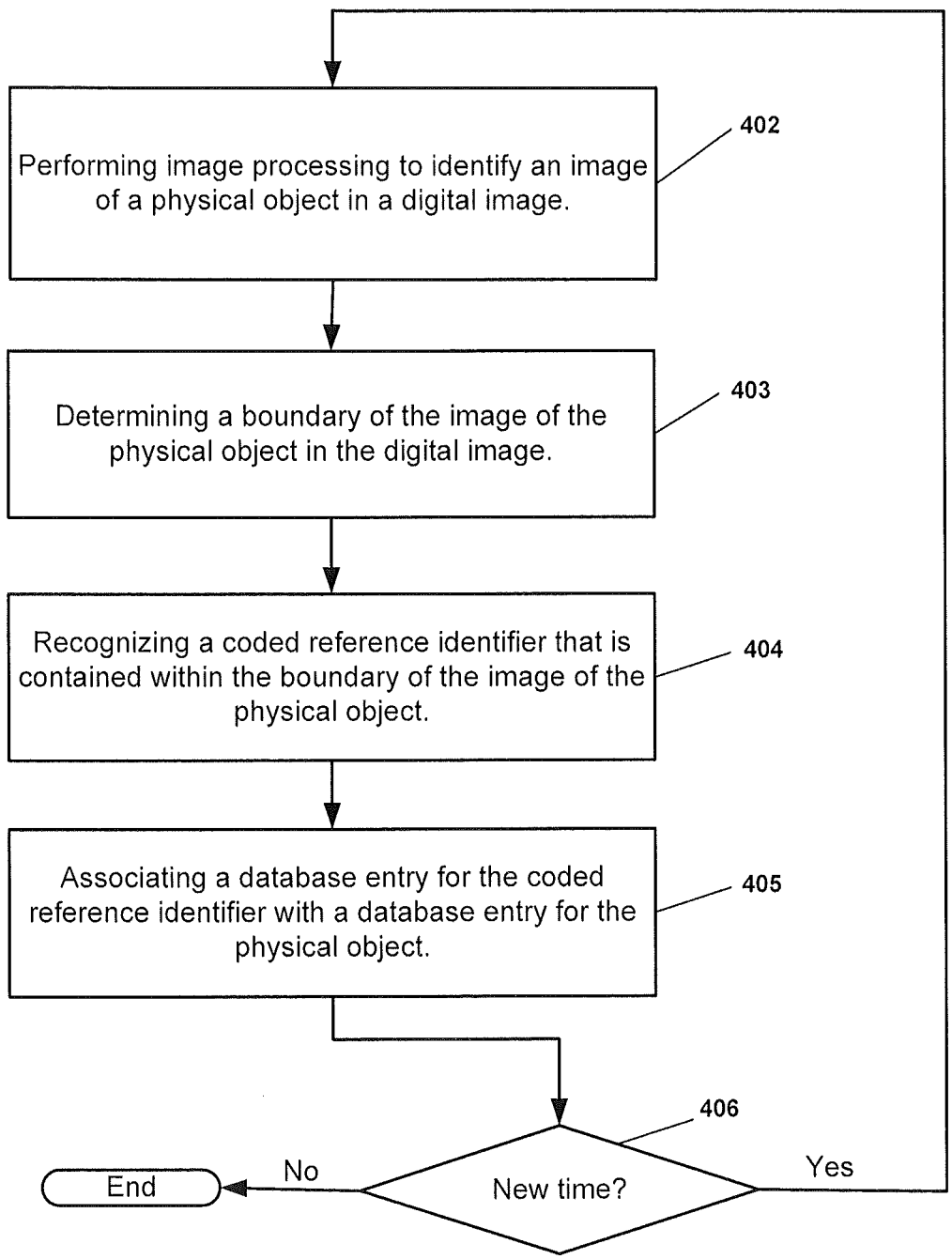
FIG. 9 is a flowchart illustrating operations performed in a next time according to some embodiments.

FIG. 9 illustrates a flowchart of operations performed at a new time according to various embodiments. The operations may be performed at periodic time intervals, at time intervals upon determination of a necessity, and/or at other new times selected automatically, randomly, and/or by a user. Referring to FIG. 9, at Block 402, image processing may be performed to identify an image of the physical object in a digital image. At Block 403, a boundary 202 of the image of the physical object in the digital image may be determined. At Block 404, a coded reference identifier that is contained within the boundary 202 of the image of the physical object may be recognized. At Block 405, a database record for the coded reference identifier may be associated with the database record for the physical object. At decision Block 406, a determination is made if the present time has advanced to a different time. If there has not been advancement to a new time, then no action is taken. If advancement to a new time is determined, then the operations 402-405 are repeated on a digital image of the data center at the new time.

Figure 10:
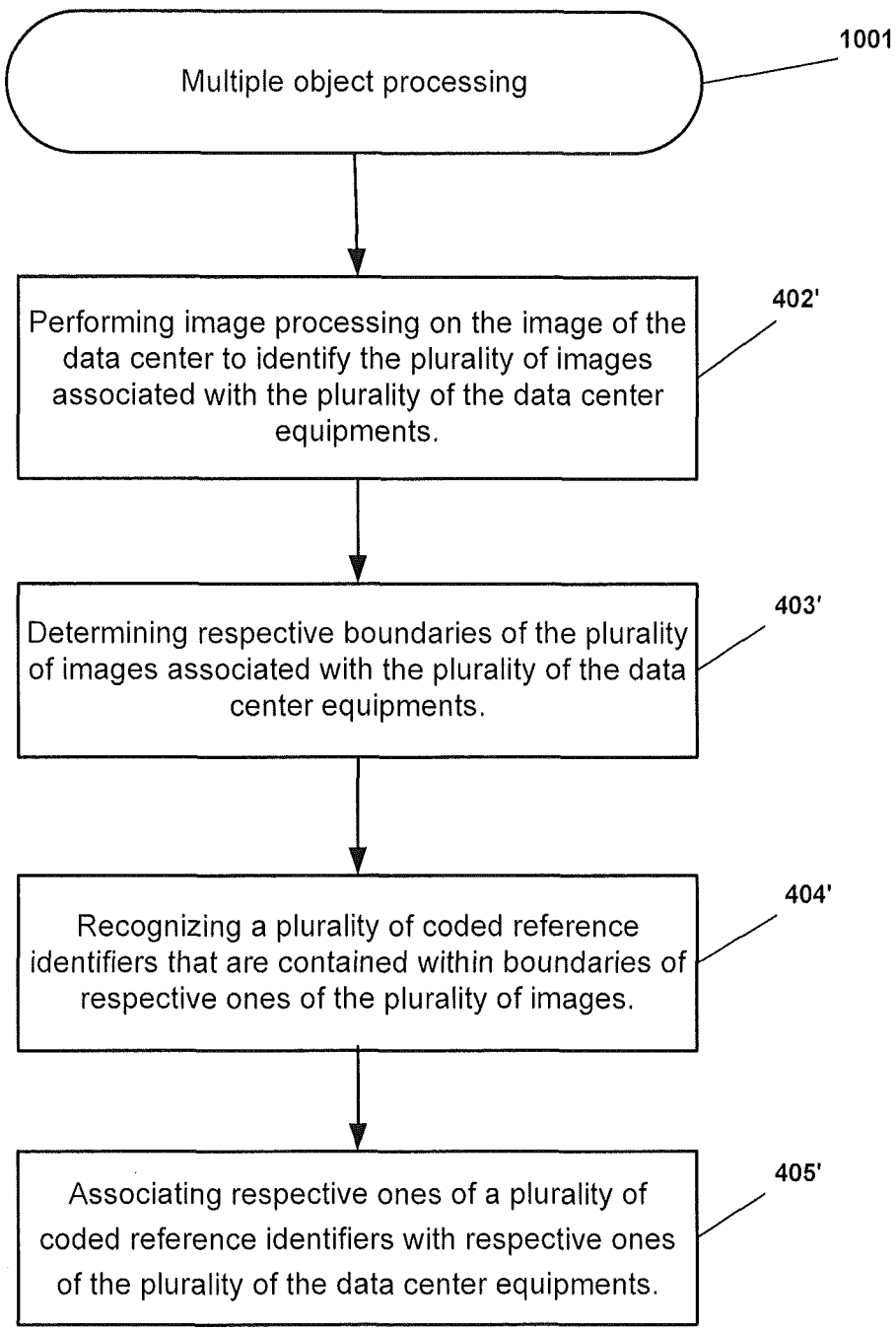
FIG. 10 is flowchart that illustrate operations for multiple object processing according to some embodiments.

FIG. 10 is a flowchart of multiple object processing 1001. A digital image 201 as in FIG. 2B of a data center 101 of FIG. 1 may include multiple data center equipments 102. Referring to FIG. 10, at Block 402', image processing may be performed on the image of the data center to identify a plurality of images associated with a plurality of data center equipments. At Block 403', respective boundaries 202 of the plurality of images associated with the plurality of data center equipments 102 may be determined. A Block 404', a plurality of coded reference identifiers 103 that are contained within the boundaries 202 of respective ones of the plurality of images may be recognized. At Block 405', respective ones of a plurality of coded reference identifiers 103 may be associated with respective ones of the plurality of data center equipments 102.

Figure 11:
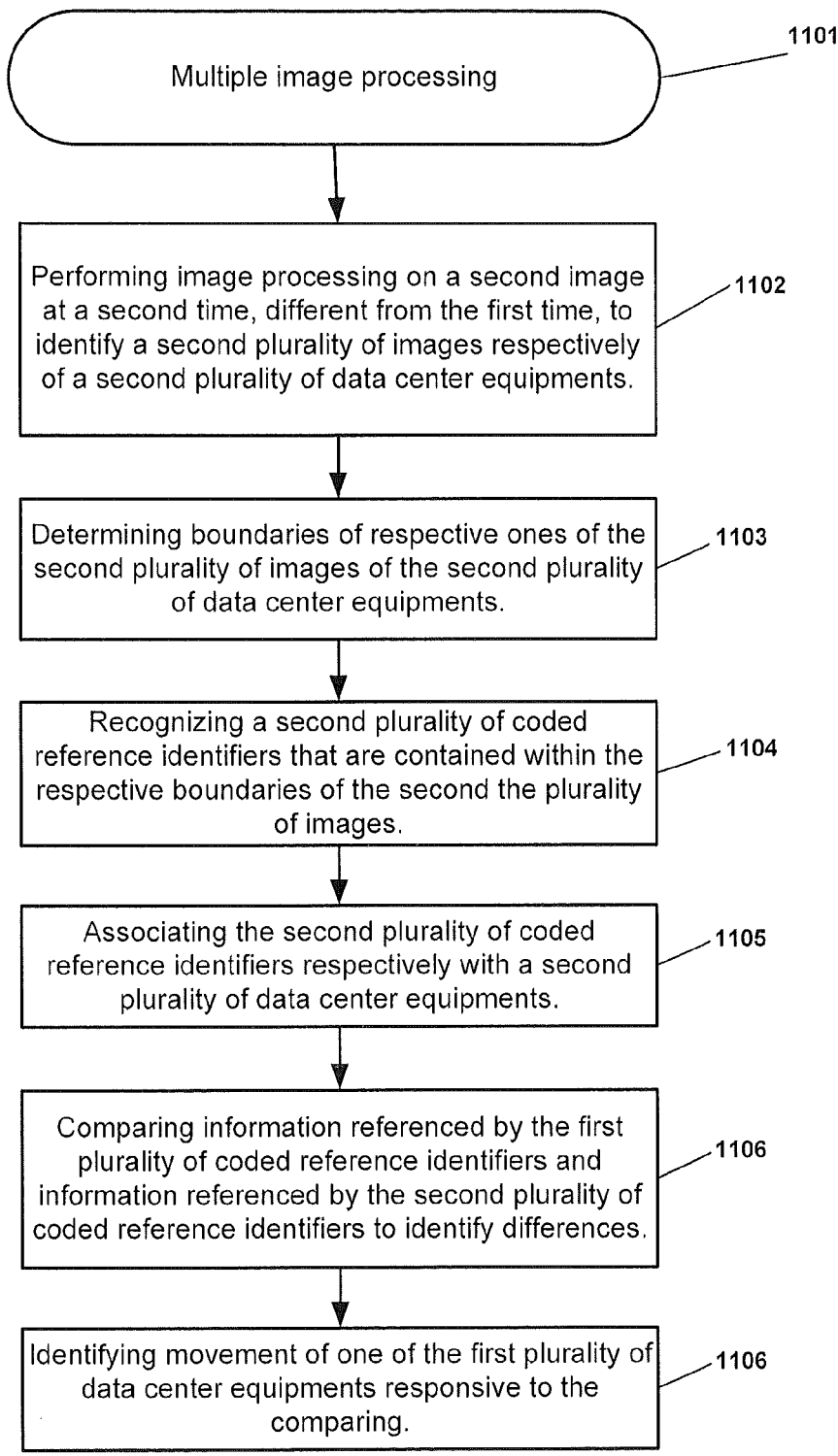
FIG. 11 is a flowchart that illustrate operations for multiple image processing according to some embodiments.

FIG. 11 illustrates a flowchart of operations for multiple image processing 1101. The multiple images may represent the data center 101 of FIG. 1 at various relevant points in time. Referring to FIG. 11, at Block 1102, image processing may be performed on a second image, at a second time different from a first time, to identify a second plurality of images of a second plurality of data center equipments. At Block 1103, boundaries 202 of respective ones of the second plurality of images of the second plurality of data center equipments are determined. At Block 1104, a second plurality of coded reference identifiers are recognized that are contained within the respective boundaries of the second plurality of images. At Block 1105, the second plurality of coded reference identifiers are associated with the second plurality data center equipments. At Block 1106, information referenced by the first plurality of coded reference identifiers and information referenced by the second plurality of coded reference identifiers are compared to identify differences. At Block 1107, movement of one of the first plurality of data center equipment is identified responsive to the aforementioned comparing of information. Movement of data center equipment may identify at least one data center equipment that has been moved to a different location or in a different orientation, when compared to a previous time. Movement of data center equipment may identify equipment that has been removed from the data center. As such, changes in configuration of the data center may be identified.

Figure 12:
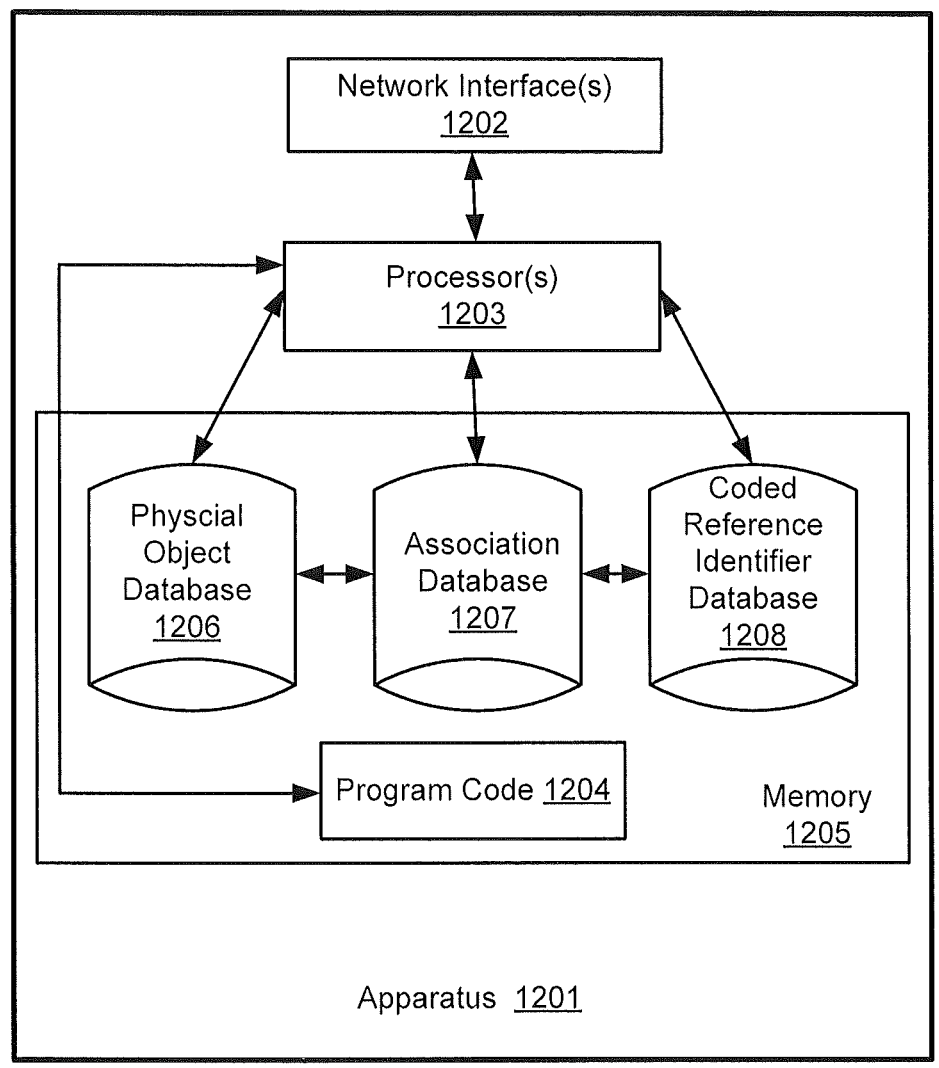
FIG. 12 is a block diagram of an apparatus that is configured according to some embodiments.

FIG. 12 is an apparatus 1201 that may be used to provide coded reference association according to various embodiments described herein. This apparatus may be embodied as one or more enterprise, application, personal, pervasive and/or embedded computer systems and/or apparatus that are operable to receive, transmit, process and store data using any suitable combination of software, firmware and/or hardware and that may be standalone or interconnected by any conventional, public and/or private, real and/or virtual, wired and/or wireless network including all or a portion of the global communication network known as the Internet, and may include various types of tangible, non-transitory computer readable media.

Referring to FIG. 12, the apparatus 1201 may include at least one wired or wireless network interface 1202. The apparatus 1201 may include at least one processor 1203 that may provide generic processor functions, computational functions, signal processing, and/or image processing. The apparatus 1201 may include memory 1205. Memory 1205 may include program code 1204, a physical object database 1206, an association database 1207, and/or a coded reference identifier database 1208. The physical object database 1206 may include records including information related to the data center equipment 102. The coded reference identifier database 1208 may include information identified by the coded reference identifier. For example, the coded reference identifier may indicate a URL which references a record in the coded reference identifier database 1208. The association database 1207 may include records that indicate an association between records in the physical object database 1206 and records in the coded reference identifier database 1208. The association may be provided, for example, by the operations of Block 405 of FIG. 4.

Additional Discussion

It may be desired to overcome a difficult problem in Virtual Reality of forming an association between meta information related to objects from the "real world" with the shapes of the "virtual world". Modern virtual environments may be illustrated, for example, by Google Street View and Google Indoor "Street View", also referred to as Google Places in order to provide a photorealistic view of a space around the viewer. However, if the environment contains physical elements that may be described in a database external to the visualization system, it may be difficult to associate an image of the object with database information related to the object. There may be a disconnect in integration of the human-computer interface offered by the visualization of an environment and the computer interface of the information systems that describes the environment.

According to various embodiments described herein, adding an element of machine-readable annotation to the physical environment prior to creation of the virtual reality images may provide a connection between the visualization environment and the database information that describes elements in the visualization environment. Labels may be created as in Block 801 of FIG. 8, that include a coded reference identifier 103 such as QR code or any other machine recognizable coding system. The coded reference identifier 103 may include a reference to the physical objects in the corresponding database. Once virtual environment images are captured, image recognition may be applied to identify shapes or boundaries 202 within the images. A coded reference identifier 103 such as a QR code may be recognized by recognition software for associating the shape with the database reference included in the QR code as in Block 405 of FIG. 4. After the association is made, a coded reference identifier may continue to be included on the image, or the coded reference identifier may be erased or blurred in the image.

According to various embodiments described herein, a semi-automated process may be applied to associate virtual reality shapes with information about physical objects represented by them. The semi-automatic process may include printing of QR codes as in Block 801 of FIG. 8, and affixing them manually to the data center equipment as in Block 802 of FIG. 8. A more fully-automated process may be utilized that includes automating the printing and affixing of QR codes. QR codes may be used for associating URLs with physical objects by using QR code recognition in the "real world". The recognition of QR codes may occur in the "virtual world".

In some embodiments, pasting a QR code on a prominent part of the equipment visible to the camera taking the pictures for creation of 2D or 3D model may be a manual step. The entire area of the QR code may be visible to the camera. The QR code itself may carry a reference to an existing database record about the equipment. In order to avoid confusion by the data center employees affixing the codes, some human readable information may be printed on the code directly or available to the QR code lookup using a hand-held scanner so that the data center employee may verify that the QR code is placed on the right equipment.

According to some embodiments, QR labels may be created and printed using a database of data center equipment inventory. The QR labels may be pasted on equipment in the data center. The QR recognition software may be primed and/or initialized with an expected range of URLs that should be found in the scanned QR codes. A camera may capture images of the data center facilities. QR codes may be collected and recognized. Database records associating original data center equipment inventory database with a 2D or plan view model of the facility may be created. Capturing the images with the camera, collecting and recognizing QR codes, and associating database records and/or entries may be performed periodically over time for the purpose of identifying changes in position of equipment, changes in quantity, and/or other changes in physical layout of equipment.

Some elements of a data center 101 of FIG. 1 may include supporting equipment 104 such as be transparent elements including, for example, dividers between the aisles, doors on the racks, etc. A QR code affixed to a transparent surface may be projected upon objects behind it. It may be desirable that the QR code pasted on transparent areas may have an indication in text encoded in the QR code indicating transparency of the object. It may be important that the transparent objects have a QR code since these objects may restrict airflow and create climate zones within a data center and/or represent an important element of data center facility.

Image recognition processes may focus on recognizing boundaries 202 of FIGS. 2B and 3B of the equipment and QR codes placed on them. Thus, as described in Block 604 of FIG. 6, other pieces of machine-recognizable information may be in a field of view of the camera, such as a brand label, inventory number, model number, as well as other QR codes. The image recognition system may make a best effort for recognizing extraneous machine recognizable information. If the QR code is related to a known range of URLs, additional recognition of the other pieces of machine-recognizable information may be used as auxiliary data.

Scanning a code from a screen of a mobile phone may represent a "common way" of using bar codes or two-dimensional codes such as QR codes. The code may be rendered on a screen of a mobile phone as an image. For example, a mobile phone may be a Code Carrier and an airport boarding terminal scanner may be a Code Scanner. The Code Carrier and Code Scanner may be physical objects existing in physical reality. Scanning may be accomplished one QR code at a time. If the image includes more than one QR code, the scanning may or may not operate properly.

Furthermore, the intent of scanning may be to access a boarding record kept in a database. Scanning may not create an association between the QR Code Carrier and the QR Code Content. The QR Code Carrier may be irrelevant to the outcome of the scanning. The QR Code Content may be used at the time of scanning and may only be used at the time of scanning.

In sharp contrast, according to various embodiments, the QR Code may be used differently from the "common way" both in the technology of code recognition and the intent of the recognition. The Code Carrier may be an image of an object in virtual reality that includes a QR Code image within it. Both the Code Carrier and the Code Content may be recognized from a virtual reality image. An association may be created between Code Carrier (i.e an area of a virtual reality image that represents an object such as a server) and the URL of a database record describing the server encoded in the Code Content. The created association may be recorded in virtual reality by creating a clickable "hot spot" that, if viewed by a user through a Virtual Reality browser, may be able to take the user to a web page associated with the URL. For example, use of a Virtual Reality Modeling Language may allow a connection to an associated web page. Access to an end point represented by an associated URL may occur when the virtual reality user clicks on the hot spot. The QR Code Content may be used after the moment of scanning and may be used multiple times. Some or all Code Carriers and/or some or all Codes found in a given image may be recognized. Multiple QR Codes may be affixed to the same Code Carrier. A physical QR code scanner may or may not be involved in the process.

Further Definitions and Embodiments:

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such ad Java, Scala, Smalltalk, Eiffel, JADE, Emerald, C++, C#, VB.NET, Python, etc., conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
    performing image processing to identify an image of a physical object within a digital image, wherein the digital image comprises an image of a data center including a plurality of images of a plurality of data center equipments in the data center, and wherein the physical object comprises a data center equipment in the plurality of data center, equipments in the data center;
    determining respective boundaries of the plurality of images associated with the plurality of the data center equipments;
    recognizing of coded reference identifiers that are contained within boundaries of respective ones of the plurality of images;
    associating respective ones of a plurality of coded reference identifiers with respective ones of the plurality of the data center equipments; and
    associating a database record for a respective coded reference identifier of the plurality of coded reference identifiers with a database record for the physical object.

2. The method of claim 1, wherein the performing image processing to identify the image of the physical object within the digital image comprises:
    receiving a selection of a portion of the image of the data center; and
    performing image processing on the image to identify the image of the data center equipment indicated by the selection.

3. A method comprising:
performing image processing to identify and image of a physical object within a digital image, wherein the physical object comprises a data center equipment in a data center;
determining a boundary of the linage of the physical object in the digital image;
recognizing a coded reference identifier that is contained within the boundary of the physical object in the digital image based on a search within the boundary of the data center equipment in the digital image to identify the coded reference identifier;
associating a database record for the coded reference identifier with a database record for the physical object, responsive to determining that the coded reference identifier is affixed to a null object based on information referenced by the coded reference identifier; and
disassociating the database record for the coded reference identifier from the database record for the data center equipment responsive to determining that the coded reference identifier is affixed to the null object.

4. The method of claim 3, further comprising:
searching within the boundary of the data center equipment in the digital image to identify auxiliary information; and
corroborating the auxiliary information and information referenced by the coded reference identifier to verify the data center equipment.

5. The method of claim 4, wherein the auxiliary information comprises alphanumeric characters.

6. The method of claim 4, wherein the auxiliary information comprises another coded reference identifier.

7. The method of claim 1, wherein the associating the database record for the respective coded reference identifier with the database record for the physical object comprises:
creating a database record comprising an association between the database record for the physical object and the database record for the respective coded reference identifier.

8. The method of claim 1, wherein the coded reference identifiers identify information related to respective database records of the respective ones of the plurality of data center equipments in the data center.

9. The method of claim 1, wherein the performing image processing to identify the image of the physical object within the digital image is preceded by;
creating a coded reference identifier label based on a database of data center equipment inventory;
attaching the coded reference identifier label to the data center equipment; and
creating the digital image comprising the data center equipment having the coded reference identifier label attached thereto.

10. The method of claim 1, wherein the performing, the determining, the recognizing, and the associating are performed repeatedly at a plurality of different times.

11. The method of Claim 1 wherein the image comprises a first image of the data center that is captured at a first time, wherein the plurality of images comprises a first plurality of images, wherein the plurality of data center equipments comprises a first plurality of data center equipments, and wherein the plurality of coded reference identifiers comprises a first plurality of coded reference identifiers associated with the first plurality of data center equipments, the method further comprising:
performing image processing on a second image at a second time, different from the first time, to identify a second plurality of images respectively of a second plurality of data center equipments;
determining boundaries of respective ones of the second plurality of images of the second plurality of data center equipments;
recognizing a second plurality of coded reference identifiers that are contained within the respective boundaries of the second the plurality of images;
associating the second plurality of coded reference identifiers respectively with a second plurality of data center equipments; and
comparing information referenced by the first plurality of coded reference identifiers associated with the first plurality of data center equipments and information referenced by the second plurality of coded reference identifiers associated with the second plurality of data center equipments to identify differences between the information referenced by the first plurality of coded reference identifiers and the information referenced by the second plurality of coded reference identifiers.

12. The method of claim 11, further comprising:
identifying movement of one of the first plurality of data center equipments responsive to the comparing.

13. An apparatus comprising:
a processor; and
a memory coupled to the processor and comprising computer readable program code that when executed by the processor causes the processor to perform operations comprising:
performing image processing to identify an image of a physical object within a digital image, wherein the digital image comprises an image of a data center including a plurality of images of a plurality of data center equipments in the data center, and wherein the physical object comprises a data center equipment in the plurality of data center equipments in the data center;
determining respective boundaries of the plurality of images associated with the plurality of the data center equipments;
recognizing a plurality of coded reference identifiers that are contained within boundaries of respective ones of the plurality of images:
associating respective ones of the plurality of coded reference identifiers with respective ones of the plurality of the data center equipments; and
associating a database record for a respective coded reference identifier of the plurality of coded reference identifiers with a database record for the physical object.

14. The apparatus of claim 13, wherein the performing image processing to identify the image of the physical object within the digital image comprises:
receiving a selection of a portion of the image of the data center; and
performing image processing on the image to identify the image of the data center equipment indicated by the selection.

15. The apparatus of claim 13, wherein the recognizing the coded reference identifier that is contained within boundary of the physical object in the digital image comprises:
searching within the boundary of the data center equipment in the digital image to identify the coded reference identifier.

16. The apparatus of claim 13, wherein the image comprises a first image of the data center that is captured at a first time, wherein the plurality of images comprises a first plurality of images, wherein the plurality of data center equipment comprises a first plurality of data center equipment, and wherein the plurality of coded reference identifiers comprises a first plurality of coded reference identifiers associated with the first plurality of data center equipment, the operations further comprise:

performing image processing on a second image at a second time, different from the first time, to identify a second plurality of images respectively of a second plurality of data center equipment;

determining boundaries of respective ones of the second plurality of images of the second plurality of data center equipment;

recognizing a second plurality of coded reference identifiers that are contained within the respective boundaries of the second the plurality of images;

associating the second plurality of coded reference identifiers respectively with a second plurality of data center equipment;

comparing information referenced by the first plurality of coded reference identifiers associated with the first plurality of data center equipment with information referenced by the second plurality of coded reference identifiers associated with the second plurality of data center equipment to identify differences between the information referenced by the first plurality of coded reference identifiers and the information referenced by the second plurality of coded reference identifiers; and identifying movement of one of the first plurality of data center equipments responsive to the comparing.

17. A computer program product comprising:

computer readable program code stored on a non-transitory computer-readable storage medium, the computer readable program code comprising:

computer readable program code configured to perform image processing to identify an image of a physical object within a digital image, wherein the digital image comprises an image of a data center including plurality of images of a plurality of data center equipments in the data center, and wherein the physical object comprises a data center equipment in the plurality of data center equipments in the data center;

computer readable program code configured to determine respective boundaries of the plurality of images associated with the plurality of the data center equipments;

computer readable program code configured to a plurality of Coded reference identifiers that are contained within boundaries of respective ones of the plurality of images;

computer readable program code configured to associate respective ones of a plurality of coded reference identifiers with respective ones of the plurality of the data center equipments; and computer readable program code configured to associate a database record for a respective coded reference identifier of the plurality of coded reference identifiers with a database record for the physical object.

* * * * *